(12) United States Patent
Silamianos et al.

(10) Patent No.: US 8,747,722 B2
(45) Date of Patent: Jun. 10, 2014

(54) SINGLE PIECE END SUPPORT FOR A VEHICLE ARTICLE CARRIER AND METHOD OF MAKING SAME

(75) Inventors: Bill M. Silamianos, Sterling Heights, MI (US); John M. Heuchert, Macomb, MI (US); Gordon Michie, LaSalle (CA)

(73) Assignee: JAC Products, Inc., Saline, MI (US)

( * ) Notice: Subject to any disclaimer, the term of this patent is extended or adjusted under 35 U.S.C. 154(b) by 258 days.

(21) Appl. No.: 13/167,191

(22) Filed: Jun. 23, 2011

(65) Prior Publication Data

US 2012/0325874 A1    Dec. 27, 2012

(51) Int. Cl.
*B28B 7/20* (2006.01)
*B60R 9/04* (2006.01)
*B29C 45/26* (2006.01)

(52) U.S. Cl.
CPC ............... *B60R 9/04* (2013.01); *B29C 45/2614* (2013.01)

USPC .......................................................... 264/318

(58) Field of Classification Search
USPC .......................................................... 264/318
See application file for complete search history.

(56) References Cited

U.S. PATENT DOCUMENTS 5,765,737 A * 6/1998 Cucheran et al. ............. 224/326
6,272,894 B1   8/2001 Hudson et al.

* cited by examiner

*Primary Examiner* — Larry Thrower
(74) *Attorney, Agent, or Firm* — Harness, Dickey & Pierce, P.L.C.

(57) ABSTRACT

A one piece end support for use with a cross bar of a vehicle article carrier system. The one piece end support may have a hollowed out neck portion adapted to receive an end of a cross bar. A hollowed out intermediate portion is provided which extends non-parallel to, but is integrally formed with, the neck portion. A flange portion is adapted to be secured to a support rail of the vehicle article carrier system. The flange portion may be integrally formed with the intermediate portion.

8 Claims, 8 Drawing Sheets

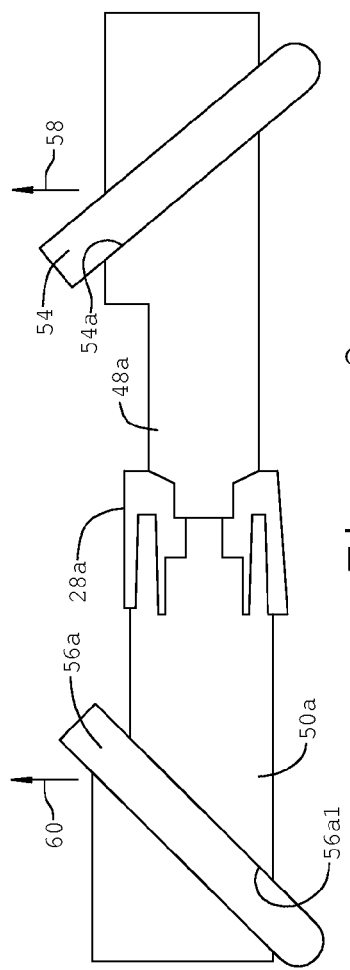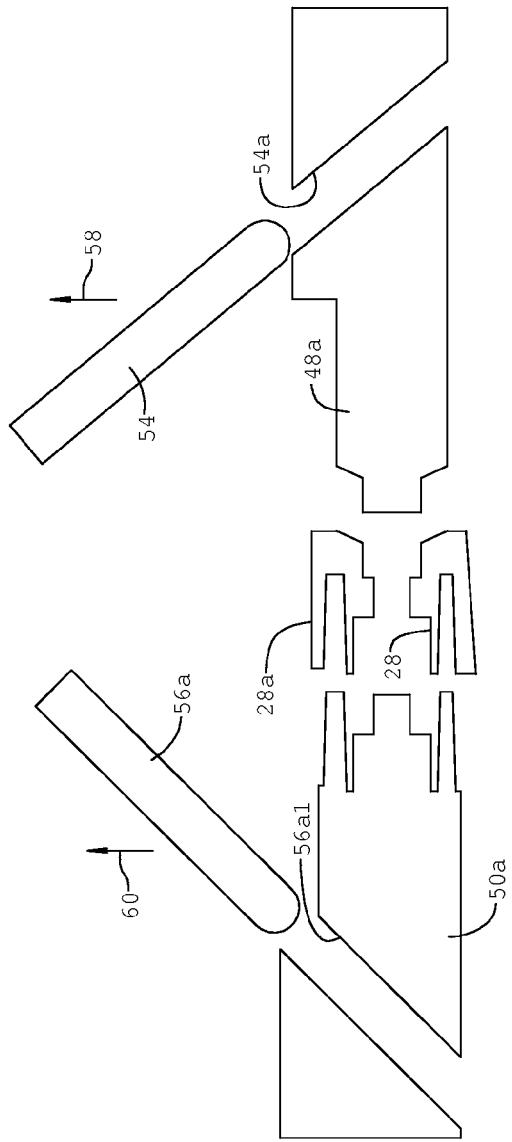

SINGLE PIECE END SUPPORT FOR A VEHICLE ARTICLE CARRIER AND METHOD OF MAKING SAME

FIELD

The present disclosure relates to vehicle article carriers and more particularly to a vehicle article carrier having a cross bar with a one piece end support, and a method of making same.

BACKGROUND

This section provides background information related to the present disclosure which is not necessarily prior art.

Vehicle article carriers are used in a wide variety of applications to support various types of articles above an outer body surface of a motor vehicle such as a sedan, SUV, crossover, minivan, etc. Typically the vehicle article carrier includes a pair of support rails that are secured to the outer body surface of the vehicle generally parallel to one another and along the major longitudinal axis of the vehicle. One or more cross bars are then secured to the support rails to extend perpendicularly between the support rails. Often a pair of cross bars is used, and at least one of the pair can be adjustably positioned on the support rails to better accommodate and support articles of different sizes and shapes thereon.

With previously used cross bars, typically an end support is located at each opposing end of the cross bar. The end support typically has some structure that enables it to be removably or releasably secured to its associated support rail. Up until the present time, the end support has been constructed with a plastic housing that is formed in two distinct and separate molded plastic parts. An example of the two parts are shown in FIGS. 1 and 2, where FIG. 1 shows a main body portion of the end support and FIG. 2 shows a cover. The cover is secured to the main body portion typically using fasteners during a subsequent assembly operation.

The requirement of having to mold the end support in two separate, distinct pieces has a number of drawbacks. Producing two distinct component pieces introduces additional costs, it can produce aesthetically unappealing seams or joint lines between the two parts, and most significantly the resulting seam between the two parts can produce additional wind noise when a vehicle is travelling at highway speeds. Accordingly, it would be highly desirable to be able to form an end support from plastic as a single piece component.

SUMMARY

In one aspect the present disclosure relates to a one piece end support for use with a cross bar of a vehicle article carrier system, the one piece end support may comprise a hollowed out neck portion adapted to receive an end of a cross bar. A hollowed out intermediate portion is provided which extends non-parallel to, but is integrally formed with, the neck portion. A flange portion is adapted to be secured to a support rail of the vehicle article carrier system. The flange portion may be integrally formed with the intermediate portion.

In another aspect the present disclosure relates to a method of forming a one piece end support for use with a cross bar of a vehicle article carrier system. The method may comprise providing a mold tool having a cavity a core member. A core may be provided which is linearly movable along a first longitudinal axis for coring out a neck portion of the one piece end support. An additional core may be provided which is moveable along a second longitudinal axis which is non-parallel to the first longitudinal axis, for coring out an intermediate portion of the one piece end support. The molding operation may involve charging the mold with a molten plastic while the core and the additional core are in first positions and then waiting a predetermined time interval for the molten plastic to at least partially cure. After the predetermined time interval has expired, then the core may be moved along the first longitudinal axis into a second position to core out the neck portion. The additional core may be moved along the second longitudinal axis, non-parallel to the first longitudinal axis, into a second position to core out the intermediate portion. The molding operation integrally forms the neck portion and the intermediate portion as a single piece component.

In still another aspect the present disclosure relates to a method of forming a one piece end support for use with a cross bar of a vehicle article carrier system, the method may comprise providing a mold tool having a cavity and a core member. A first core may be provided which is linearly moveable along a first longitudinal axis for coring out a neck portion of the one piece end support. A second core may be provided which is moveable along a second longitudinal axis which is non-parallel to the first longitudinal axis, for coring out an intermediate portion of the one piece end support. A third core may be provided which is moveable along a third longitudinal axis parallel to the first longitudinal axis to core out a portion of a flange of the one piece end support. A molding operation is conducted which involves charging the mold with a molten plastic while the first, second and third cores and each in a first position and then waiting a predetermined time interval for the molten plastic to at least partially cure. After the predetermined time interval has expired, then the first core is moved along the first longitudinal axis into a second position to core out the neck portion. The second core is moved along the second longitudinal axis, non-parallel to the first longitudinal axis, into a second position to core out the intermediate portion. The third core is moved along the third longitudinal axis into a second position to core out the portion of the flange. The molding operation results in the neck portion, the intermediate portion and the flange being integrally formed as a single piece component.

DRAWINGS

The drawings described herein are for illustrative purposes only of selected embodiments and not all possible implementations, and are not intended to limit the scope of the present disclosure.

Figure 6:
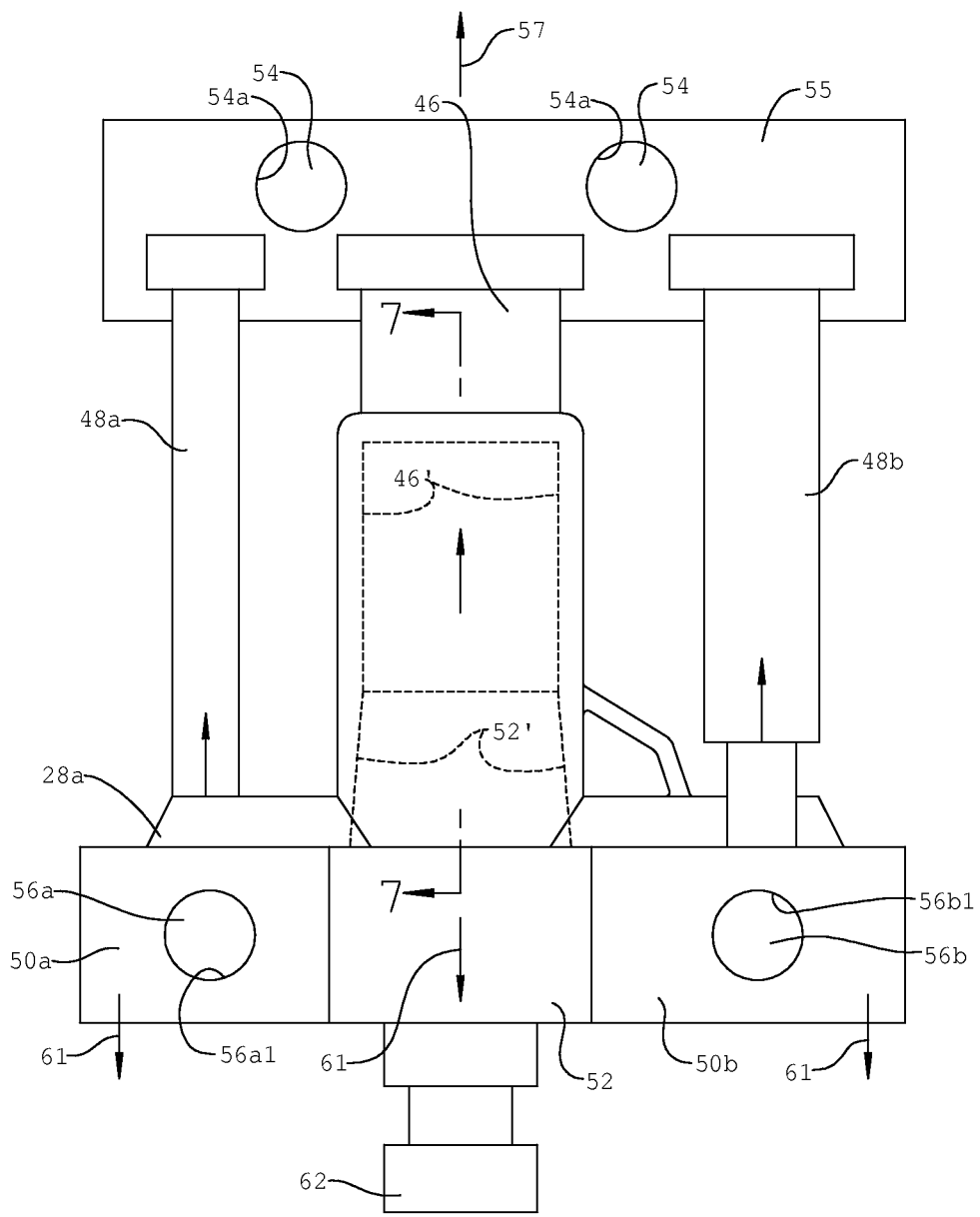
FIG. 6 is a plan view of the mold tool of FIG. 5 with a representation of the end support shown therein to help illustrate how the various moveable cores of the mold tool are positioned in relation to the portions of the end support that will be eventually formed in the mold tool.
Figure 7:
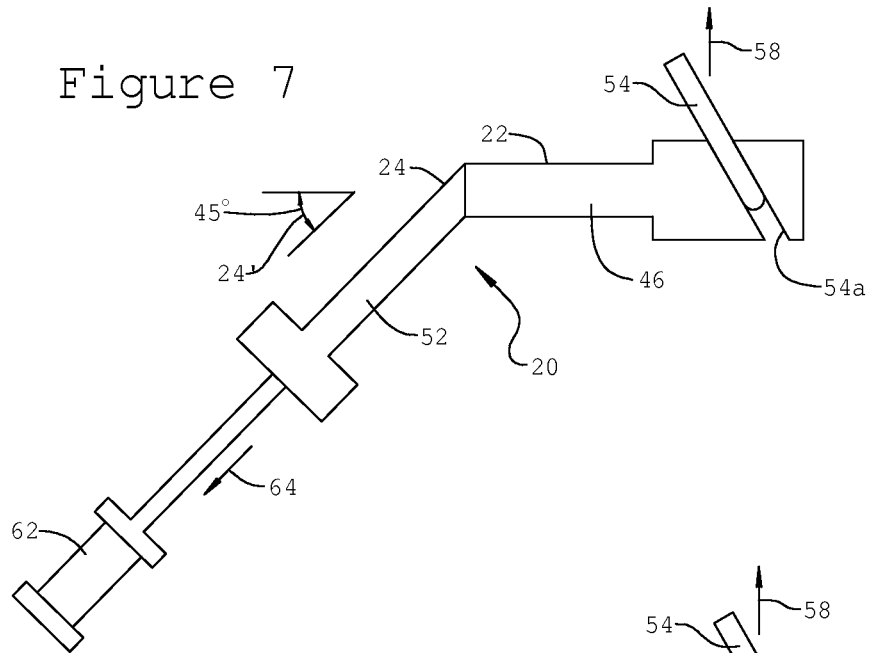
Figure 8:
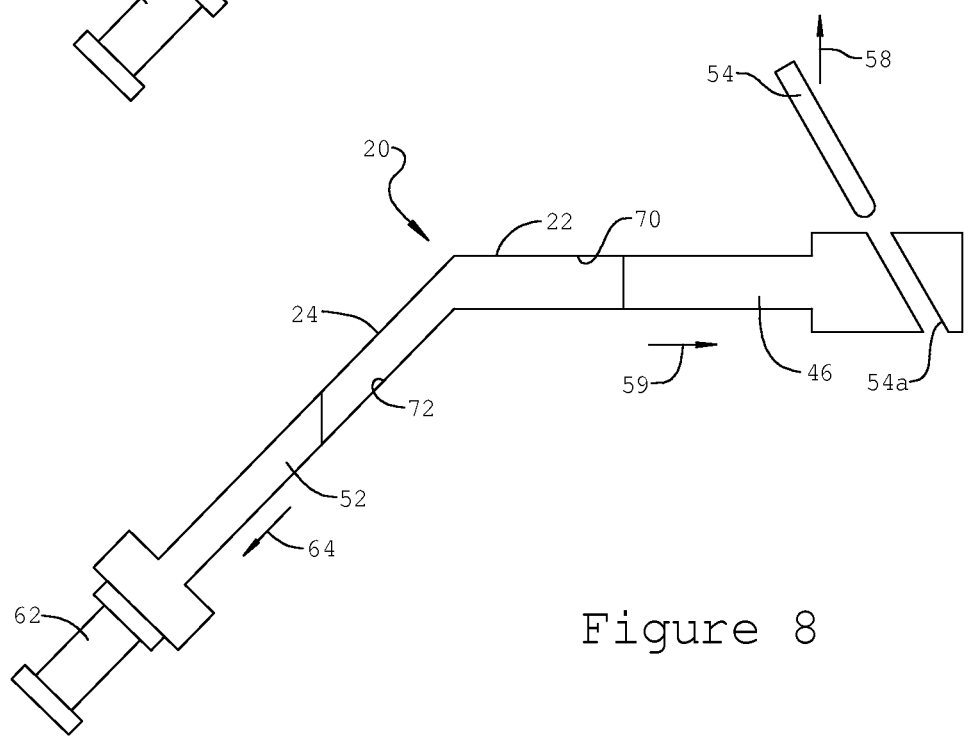

FIG. 7 is a simplified side cross-sectional view of the mold tool showing two of the cores used to form the neck and intermediate portions of the end support, and also showing the hydraulic cylinder that is used to slidably withdraw one of the cores from the intermediate portion, while a horn pin is used to withdraw a different core from the neck portion in a direction non-parallel to the movement of the core that is coring out the intermediate portion;

FIG. 8 is a side view of the mold tool showing the two cores after they have been moved to reveal the hollow areas of the intermediate and neck portions of the end support;

FIG. 9 is a simplified side view of the mold tool showing the two cores that are used to core out the circled area of the flange as shown in FIG. 6; and FIG. 10 is a simplified side view of the mold tool of FIG. 9 showing the positions of the two cores after they have been used to core out the circular area of the flange in FIG. 6.

DETAILED DESCRIPTION

Example embodiments will now be described more fully with reference to the accompanying drawings. Corresponding reference numerals indicate corresponding parts throughout the several views of the drawings.

Figure 3:
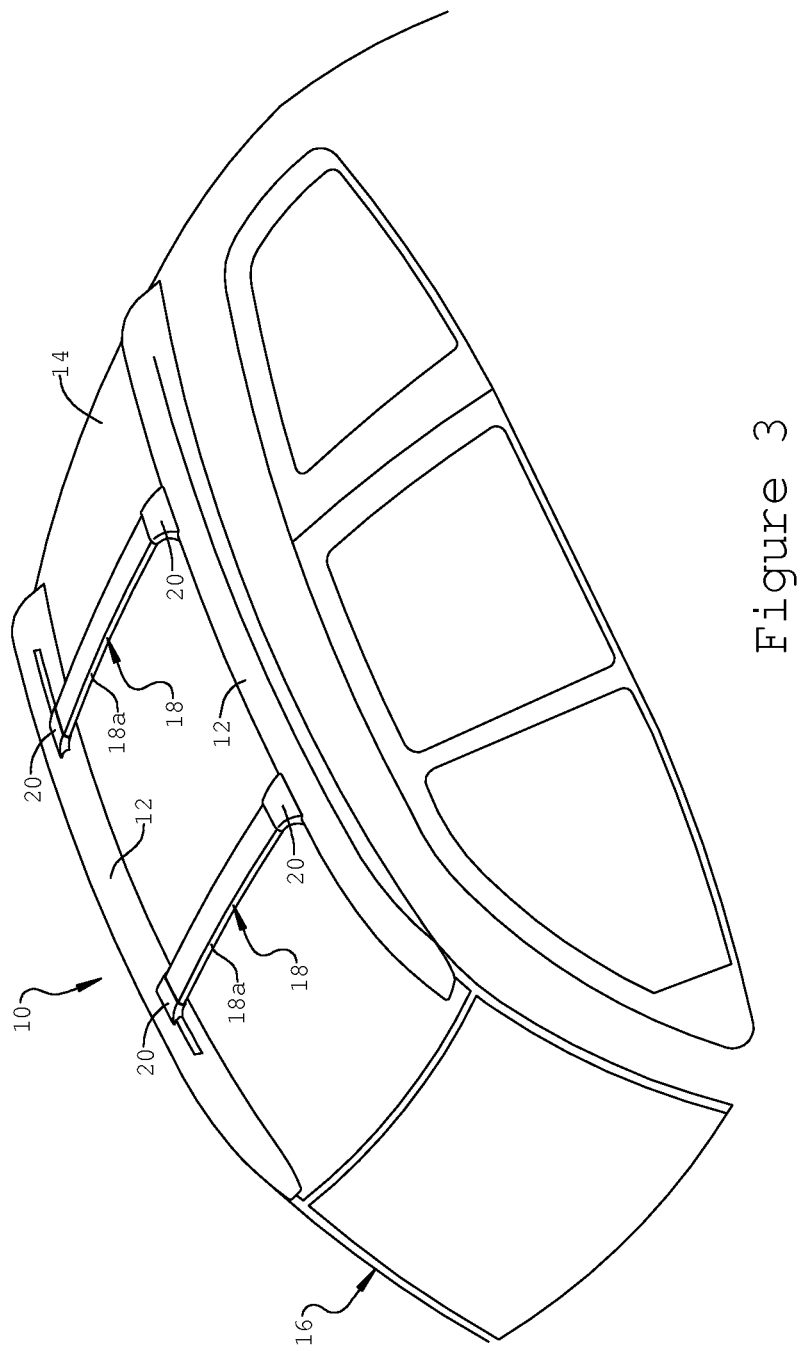
FIG. 3 is a perspective view of a vehicle article carrier system installed on a motor vehicle, and where the system employs cross bars that each have a pair of one piece end supports made in accordance with the present disclosure.

Referring to FIG. 3 there is shown a vehicle article carrier system 10 in accordance with the present disclosure. The vehicle article carrier system 10 includes a pair of support rails 12 that are fixedly secured to an outer body surface 14 of a vehicle 16. The vehicle article carrier 16 is not limited to use with only one style of vehicle but rather may be used with virtually any type of vehicle such as a sedan, an SUV, a crossover, a mini-van, a full-size van, light truck, etc. The support rails 12 may be secured generally parallel to one another such that they extend along a major longitudinal axis of the vehicle. At least one cross bar 18, and more preferably a pair of cross bars 18, are secured to the support rails such that they rest above the outer body surface 14. In this example each of the cross bars 18 may be adjustably positioned on the support rails 12. Each cross bar 18 includes a pair of end supports 20 that allow the opposing ends of a member 18a of its associated cross bar 18 to be removably, and in this example adjustably, secured to the support rails 12. It is a significant advance in the art, as will be explained more fully in the following paragraphs, that each end support 20 is formed as a single piece, high strength, plastic component in a single molding operation.

Figure 4:
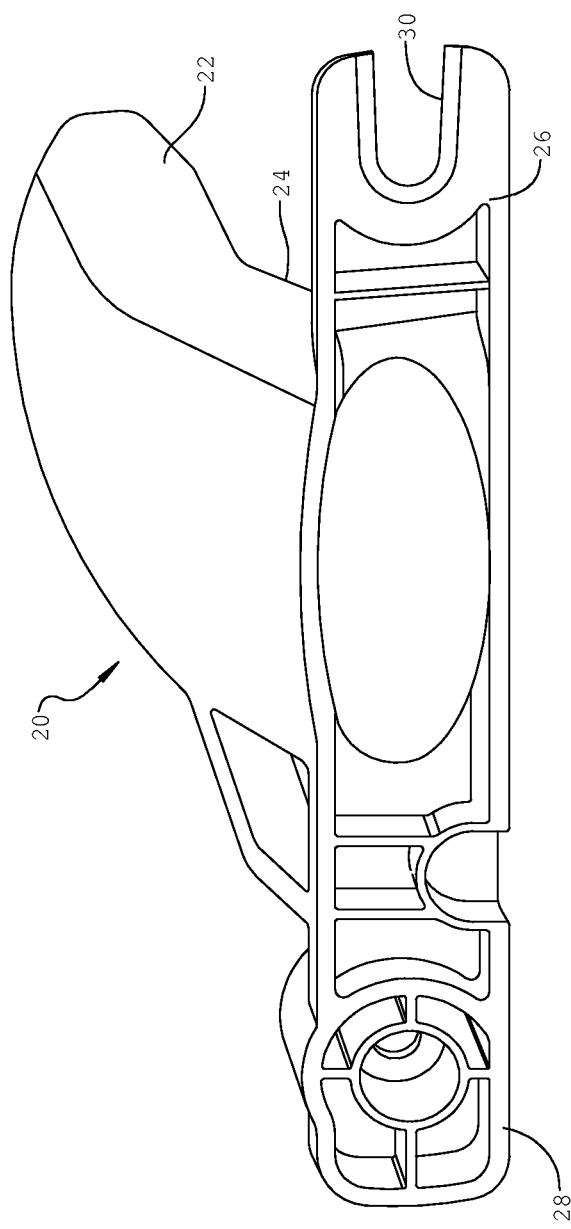
FIG. 4 is an enlarged perspective view of one of the one piece end supports shown in FIG. 3.

Referring to FIG. 4, one of the one piece end supports 20 is shown in greater detail. For convenience the one piece end support 20 will be referred to throughout the following discussion simply as the "end support 20". The end support 20 includes a neck portion 22, an intermediate portion 24 and a flange portion 26, all integrally formed as a single piece component. As will be further illustrated in the following paragraphs, the neck portion 22 is hollow and is adapted to receive an end of the member 18a which is fixedly secured thereto. The intermediate portion 24 is also hollow and is integrally formed with the neck portion 22 to extend in a direction non-parallel to the longitudinal axis of the neck portion 22. The flange portion 26 is integrally formed with the intermediate portion 24 and is laterally offset from the axial centerline of the neck portion 22. The flange portion 26 may be formed with openings 28 and 30 to permit additional fastening structure such as a threaded bolt of a tap plate assembly and a T-stud to be secured to the flange portion 26, which enables the entire end support 20 to be adjustably secured at a desired location along its associated support rail 12. Opening 30 may fit vertically over a T-shaped feature (not shown) in the support rail 12, and may rotate 90 degrees to remove or install.

Figure 5:
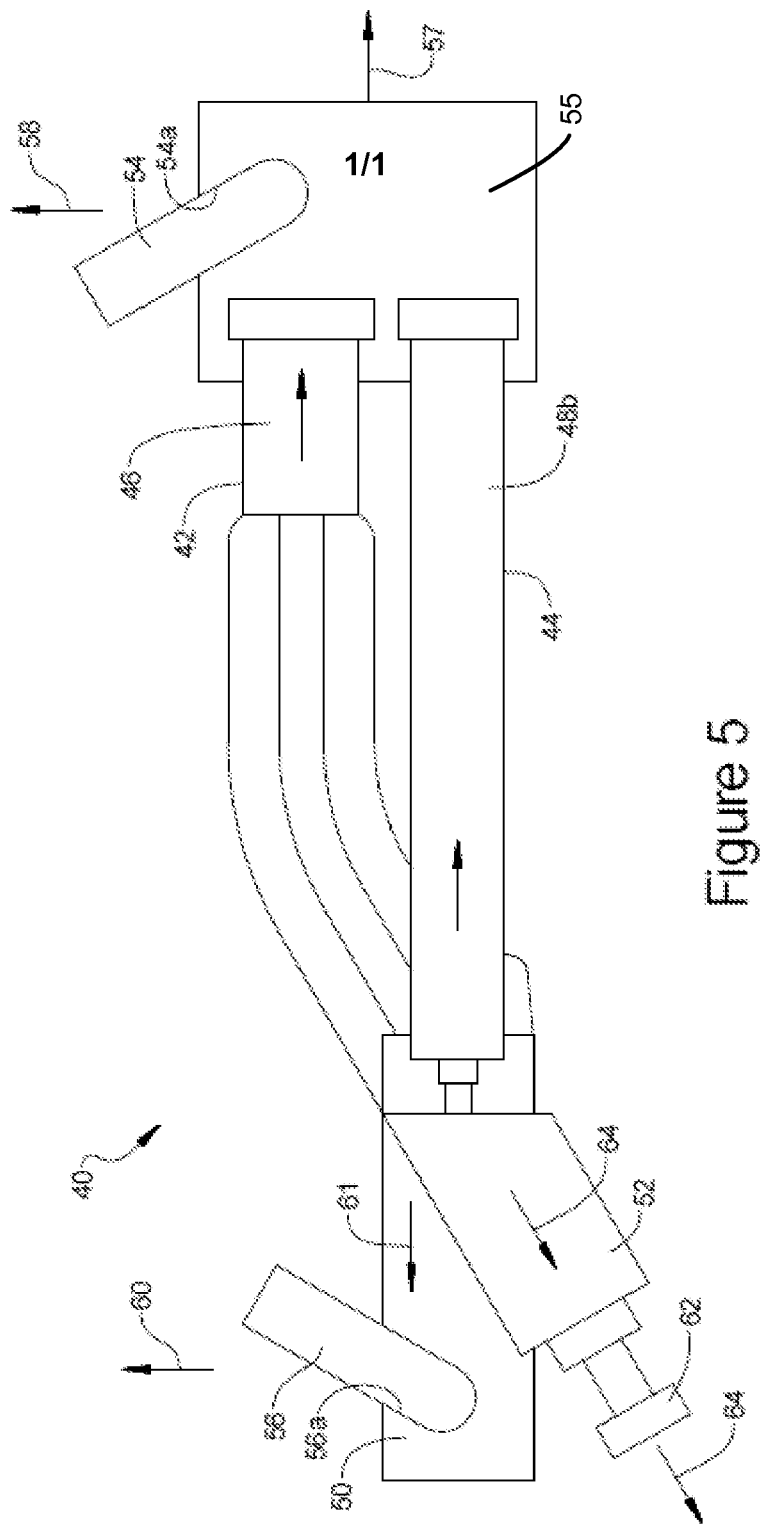
FIG. 5 shows a cross-sectional side view of a mold tool with a plurality of cores, and showing the one piece end support in shading to give a better understanding of the relationship of the various cores of the mold tool to the various portions of the end support.

Referring now to FIGS. 5 and 6, a mold tool 40 for molding the end support 20 will be described. The mold tool 40 includes a cavity 42, a core component 44, a first core 46, a second core 48a, a third core 48b, a fourth core 50a, a fifth core 50b, a sixth core 52 and a slide component 55. Horn pins 54 extend into channels 54a in the slide member 55. Horn pins 56a and 56b extend into bores 56a1 and 56b1 in cores 50a and 50b, respectively. The horn pins 54 and 56 and are each moveable along longitudinal paths denoted by arrows 58 and 60, respectively, as shown in FIG. 5. Cores 46, 48a and 48b may all be coupled to the slide member 55. As a result, when the horn pins 54 are lifted they serve to move the slide member 55 slidably in the direction of arrow 57 as shown in FIGS. 5 and 6, which also causes the cores 46, 48a and 48b to be moved simultaneously in the direction of arrow 57.

Each of the cores 46, 48a, 48b, 50a, 50b and 52 may preferably be formed in connection with the cavity 42 to provide a small degree of draft, preferably about 1-3 degrees, to allow each of the cores to be easily removed from the formed end support 20 without binding. An example of this draft is indicated in FIG. 6 by dashed lines 46' and 52', which illustrate this draft with respect to the cores 46 and 52. The specific angle that the intermediate portion 24 extends relative to the neck portion 22 may vary to suit the needs of a particular vehicle application. In this example, however, the angle is between about 30-60 degrees, and more specifically about 45 degrees, as indicated by angle 24' in FIG. 7.

Referring to FIGS. 5, 7 and 8, in order to create the hollow interior of the intermediate portion 24, a mechanism, in one embodiment a hydraulic cylinder 62, is used to draw the core 52 along a path parallel to arrow 64, which is non-parallel to the direction of draw of the cores 46, 48a, 48b, 50a and 50b. Referring to FIGS. 9 and 10, the cores 48a and 50a, respectively, are shown along with a portion 28a (shown in FIG. 6) around the opening 28 in the flange 26. It will be appreciated that while a hydraulic cylinder 62 is used to withdraw the core 52, any suitable mechanism capable of withdrawing the core 52 could be used. Other mechanisms may involve pneumatic devices, stepper motors, or virtually any other form of device capable of moving the core 52 in a controlled manner.

In operation the mold tool core component 44 and the cores 46, 48a, 48b, 50a, 50b and 52 are positioned within the mold tool cavity 42 as shown in FIGS. 5 and 6 and then the mold tool 40 is charged with a molten plastic. One particular plastic that is suitable for forming high strength end supports is glass filled nylon or polyester. Furthermore, the present disclosure is not limited to use with any specific type of plastic.

After the mold tool cavity 42 has been fully charged with molten plastic the plastic is allowed to cure for a short period of time, and typically between 30-45 seconds. At that point the horn pins 54 are lifted in accordance with the direction of arrow 58 in FIG. 7, which causes the slide member 55 to slide in the direction of arrow 59 in FIG. 8. This creates a hollow area 70, as shown in FIG. 8, within the neck portion 22 of the end support 20.

As the horn pins 54 are lifted, horn pins 56a and 56b are also lifted in the direction of arrow 60 as indicated in FIG. 5. The lifting of horn pins 56a and 56b causes the cores 50a and 50b to move in the direction of arrow 61 in FIGS. 5 and 6. This creates the openings 28 and 30, shown in FIG. 4, in the flange 26 of the end support 20.

Figure 1:
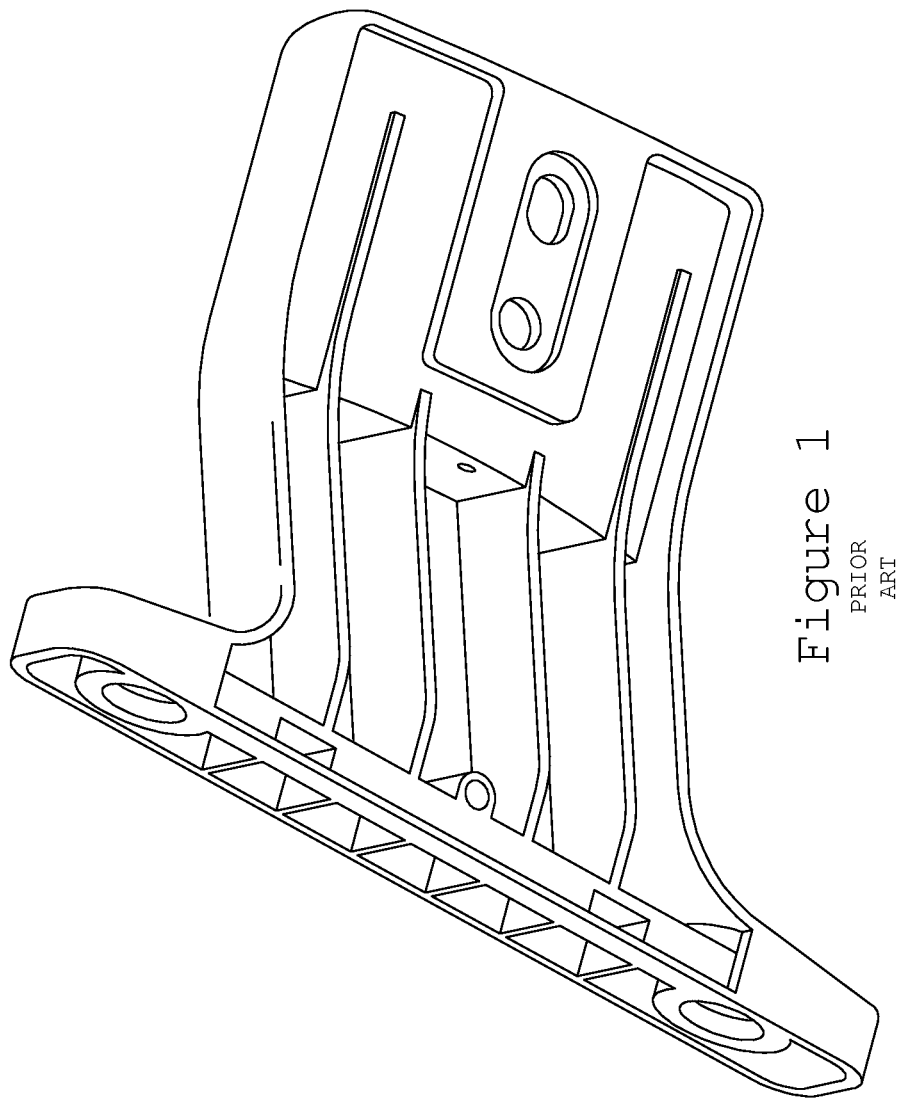
FIG. 1 is a perspective view of a prior art, two piece end support housing without its lower cover secured thereto, which is made from a conventional two piece construction operation in which the main body portion of the end support and the cover are formed in separate molding operations and then subsequently joined together by external fasteners.
Figure 2:
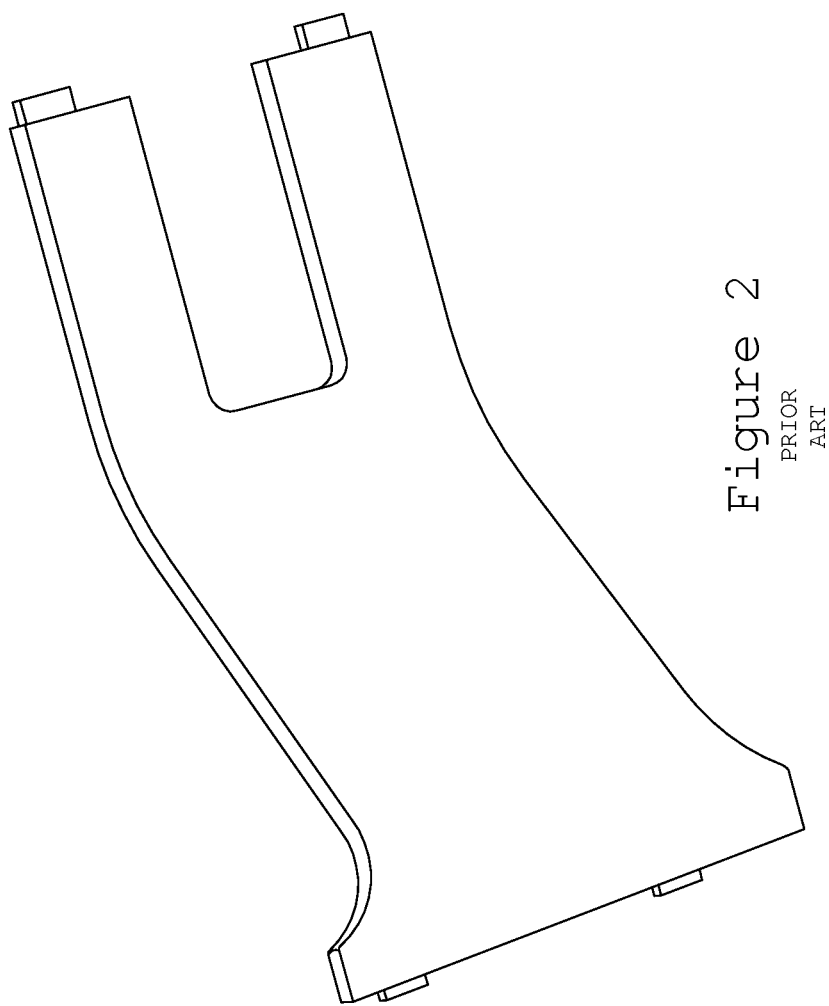
FIG. 2 is a perspective view of a prior art cover suitable for use with the two piece end support shown in FIG. 1.

Likewise, as the horn pins 54 are lifted, the hydraulic cylinder 62 withdraws the core 52 parallel to and in the direction of arrow 64 in FIG. 8. This creates a hollow area 72, as shown in FIG. 8, within the intermediate portion 24 of the end support 20. Thus, the neck portion 22, the intermediate portion 24 and the flange portion 26 are all integrally formed as a single component. Thus, there is no exposed cavity that would need to be covered with a separate cover member such as shown in FIG. 2.

It will also be appreciated that while the above operations of moving the cores 46, 48a, 48b, 50a, 50b and 52 are all performed substantially simultaneously, they need not be performed simultaneously. It is well within the scope of the present disclosure to move select ones of the cores 46, 48a, 48b, 50a, 50b and 52 at isolated times, for example a few minutes before or after other ones of the cores are moved. Also, while cores 46, 48a and 48b are all described as being secured to the slide member 55 and moving simultaneously in response to movement of the horn pins 54, it will be appreciated that the cores 46, 48a and 50a could be moved independently of one another if each is provided with its own horn pin.

The ability to make the end support 20 as a single piece component provides a number of important advantages. One advantage is that it significantly simplifies the manufacture of the end support 20 and reduces manufacturing time and costs. Another significant advantage is that there are no gaps present on the surface of the end support 20, as would likely be the case with a two piece end support. The presence of gaps is undesirable as they may detract from the aesthetic and aerodynamic characteristics of an end support.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a one piece, cross bar end support for coupling an end of a cross bar of a vehicle article carrier system to a support rail which is secured to a vehicle outer body surface, the method comprising:
   providing a mold tool having a cavity and a core member;
   providing a core which is linearly movable along a first longitudinal axis for coring out a neck portion of the one piece end support, the neck portion being hollow and adapted to receive an end of a cross bar there within;
   providing an additional core which is moveable in a direction opposite to the core and along a second longitudinal axis which is non-parallel to the first longitudinal axis, for coring out an intermediate portion of the one piece end support adjacent to the neck portion;
   charging the mold with a molten plastic while the core and the additional core are in first positions;
   waiting a predetermined time interval for the molten plastic to at least partially cure;
   after the predetermined time interval has expired, then:
      moving a first horn pin operably associated with the core in a direction generally perpendicular to the first longitudinal axis to cause movement of the core along the first longitudinal axis into a second position to core out the neck portion;
      moving a second horn pin operably associated with the additional core to cause movement of the additional core along the second longitudinal axis, at an angle of between 30-60 degrees relative to the first longitudinal axis, into a second position to core out the intermediate portion;
   the neck portion and the intermediate portion being integrally formed as a single piece component without gap lines;
   further comprising using the cavity and the core component to form flange portions that extend outwardly from opposite sides of the intermediate portion, the flange portions being adapted to permit securing of the cross bar end support to the support rail; and
   further comprising using another core to core out a portion of one of the flange portions.

2. The method of claim 1, wherein moving the additional core comprises using the second horn pin engaged within an angled opening in the additional core to move the additional core along a path generally perpendicular to the direction of movement of the second horn pin.

3. The method of claim 1, wherein moving the additional core along the second longitudinal axis comprises moving additional core along an axis that extends at about a 45 degree angle relative to the first longitudinal axis.

4. A method of forming a one piece cross bar end support for coupling an end of a cross bar of a vehicle article carrier system to a support rail secured to an vehicle outer body surface, the method comprising:
   providing a mold tool having a cavity and a core member;
   providing a first core which is linearly movable along a first longitudinal axis for coring out a neck portion of the one piece end support, the neck portion being hollow and adapted to receive an end of a cross bar there within;
   providing a second core which is moveable along a second longitudinal axis which is non-parallel to the first longitudinal axis, and away from the first core, for coring out an intermediate portion of the one piece end support adjacent to the neck portion;
   providing a third core which is moveable in a direction away from the first core, and along a third longitudinal axis parallel to the first longitudinal axis, to core out a portion of a flange of the one piece end support;
   charging the mold with a molten plastic while the first, second and third cores are each in a first position;
   waiting a predetermined time interval for the molten plastic to at least partially cure;
   after the predetermined time interval has expired, then:
      moving the first core along the first longitudinal axis into a second position to core out the neck portion to create a hollow area into which the end of the cross bar is inserted;
      moving the second core away from the first core along the second longitudinal axis, the second longitudinal axis defining an angle of between 30-60 degrees relative to the first longitudinal axis, into a second position to core out the intermediate portion;
      moving the third core along the third longitudinal axis, and away from the first core, into a second position to core out the portion of the flange; and
   the neck portion, the intermediate portion and the flange being integrally formed as a single piece component without gap lines, and the flange formed by two portions extending outwardly in opposite directions from the intermediate portion and adapted to permit securing of the cross bar end support to the support rail.

5. The method of claim 4, further comprising disposing a fourth core in a portion of the flange prior to charging the mold, and after the predetermined time interval, moving the fourth core in a direction opposite to a direction of movement of the third core to core out an additional portion of the flange.

6. The method of claim 5, wherein the second longitudinal axis extends at an angle of about 45 degrees relative to the first axis.

7. The method of claim 6, wherein the first, second and third cores are moved substantially simultaneously.

8. The method of claim 4, further comprising:
coupling the first and third cores to a block, and using at least one horn pin to move the block parallel to the first longitudinal axis, to thus cause movement of the first core and the third core.

* * * * *